(12) United States Patent
Wang et al.

(10) Patent No.: US 10,114,161 B2
(45) Date of Patent: Oct. 30, 2018

(54) MULTI-LAYER ABSORPTIVE WIRE GRID POLARIZER

(71) Applicant: Moxtek, Inc., Orem, UT (US)

(72) Inventors: Bin Wang, Lindon, UT (US); Mark Davis, Springville, UT (US)

(73) Assignee: Moxtek, Inc., Orem, UT (US)

( * ) Notice: Subject to any disclaimer, the term of this patent is extended or adjusted under 35 U.S.C. 154(b) by 160 days.

(21) Appl. No.: 15/248,846

(22) Filed: Aug. 26, 2016

(65) Prior Publication Data

US 2016/0363706 A1    Dec. 15, 2016

Related U.S. Application Data

(60) Division of application No. 14/314,814, filed on Jun. 25, 2014, now abandoned, which is a
(Continued)

(51) Int. Cl.
*G02B 5/30*        (2006.01)
*G02B 5/22*        (2006.01)

(52) U.S. Cl.
CPC ......... *G02B 5/3058* (2013.01); *G02B 5/3075* (2013.01); *G02B 5/22* (2013.01)

(58) Field of Classification Search
CPC ... G02B 5/3025–5/3058; G02B 5/3075; G02B 27/286; G02F 1/133528; G02F 1/133533; G02F 1/133536; G02F 2001/133548; G03F 7/70191; G03F 7/70308; G03F 7/70566; B32B 2307/42
(Continued)

(56) References Cited

U.S. PATENT DOCUMENTS 5,991,075 A    11/1999   Katsuragawa et al.
6,122,103 A     9/2000   Perkins et al.
(Continued)

FOREIGN PATENT DOCUMENTS

DE    10327963 A1    1/2005
JP       1021385     8/1998
JP    2012/103728    5/2012

OTHER PUBLICATIONS

Wang et al.; "Innovative High-Performance Nanowire—Grid Polarizers and Integrated Isolators"; IEEE Journal of Selected Topics in Quantum Electronics; Feb. 2005; p. 241-253; vol. 11 No. 5.
(Continued)

*Primary Examiner* — Stephone B Allen
*Assistant Examiner* — James McGee
(74) *Attorney, Agent, or Firm* — Thorpe, North & Western, LLP

(57) ABSTRACT

A wire grid polarizer comprising on array of parallel, elongated first rib groups disposed over a substrate. Each first rib group can comprise a central first transmissive rib and a pair of first wires including a first wire disposed along each side of the first transmissive rib. A first dielectric material can substantially fill first gaps between each rib group and an adjacent rib group. An array of parallel, elongated second wires can be disposed over the rib groups and the first dielectric material. The first wires or the second wires can be absorptive and the other of the first wires or the second wires can be reflective.

20 Claims, 12 Drawing Sheets

Related U.S. Application Data continuation-in-part of application No. 13/326,566, filed on Dec. 15, 2011, now abandoned.

(60) Provisional application No. 61/863,298, filed on Aug. 7, 2013, provisional application No. 61/428,555, filed on Dec. 30, 2010.

(58) Field of Classification Search
USPC .................. 359/352, 485.01, 485.05, 487.03
See application file for complete search history.

(56) References Cited

U.S. PATENT DOCUMENTS

| | | |
|---|---|---|
| 6,251,297 B1 | 6/2001 | Komuro et al. |
| 6,288,840 B1 | 9/2001 | Perkins et al. |
| 6,665,119 B1 | 12/2003 | Kurtz et al. |
| 7,233,563 B2 | 6/2007 | Ueki et al. |
| 7,692,860 B2 | 4/2010 | Sato et al. |
| 7,961,393 B2 | 6/2011 | Perkins et al. |
| 8,467,128 B2 | 6/2013 | Huang |
| 8,506,827 B2 | 8/2013 | Wu et al. |
| 8,611,007 B2 | 12/2013 | Davis |
| 8,709,703 B2 | 4/2014 | Deng et al. |
| 8,755,113 B2 | 6/2014 | Gardner et al. |
| 8,804,241 B2 | 8/2014 | Wu et al. |
| 8,808,972 B2 | 8/2014 | Wang et al. |
| 8,913,321 B2 | 12/2014 | Davis |
| 9,348,076 B2 | 5/2016 | Wang et al. |
| 9,354,374 B2 | 5/2016 | Wang et al. |
| 2003/0223118 A1 | 12/2003 | Sakamoto |
| 2006/0119937 A1 | 6/2006 | Perkins et al. |
| 2007/0297052 A1 | 12/2007 | Wang et al. |
| 2008/0186576 A1* | 8/2008 | Takada ............... G02B 5/3025 359/487.03 |
| 2009/0041971 A1 | 2/2009 | Wang et al. |
| 2010/0302481 A1 | 12/2010 | Baum et al. |
| 2012/0075699 A1 | 3/2012 | Davis et al. |
| 2014/0300964 A1 | 10/2014 | Davis et al. |
| 2015/0077851 A1 | 3/2015 | Wang et al. |
| 2015/0131150 A1 | 5/2015 | Probst et al. |
| 2015/0346497 A1 | 12/2015 | Huang et al. |
| 2016/0062017 A1 | 3/2016 | Nielson et al. |
| 2016/0231487 A1 | 8/2016 | Wangensteen et al. |
| 2016/0291227 A1 | 10/2016 | Nielson et al. |
| 2016/0357064 A1 | 12/2016 | Nielson et al. |

OTHER PUBLICATIONS

Lopez et al.; "Wave-plate polarizing beam splitter based on a form-birefringent multilayer grating"; Optics Letters; Oct. 15, 1998; p. 1627-1629; vol. 23, No. 20; Optical Society of America.

Tyan et al.; "Design, fabrication, and characterization of form-birefringent multilayer polarizing beam splitter"; J. Opt. Soc. Am. A; Jul. 1997; p. 1627-1636; vol. 14, No. 7; Optical Society of America.

Tyan et al.; "Polarizing beam splitter based on the anisotropic spectral reflectivity characteristic of form-birefringent multilayer gratings"; Optic Letters; May 15, 1996; p. 761-763; vol. 21, No. 10; Optical Society of America.

Stenkamp et al, "Grid polarizer for the visible spectral region." SPIE vol. 2213 pp. 288-296.

* cited by examiner

MULTI-LAYER ABSORPTIVE WIRE GRID POLARIZER

CLAIM OF PRIORITY

This is a divisional of U.S. patent application Ser. No. 14/314,814, filed on Jun. 25, 2014, which claims priority to U.S. Provisional Patent Application No. 61/863,298, filed on Aug. 7, 2013; and which is a continuation-in-part of U.S. patent application Ser. No. 13/326,566, filed on Dec. 15, 2011, which claims priority to U.S. Patent Application Ser. No. 61/428,555, filed Dec. 30, 2010; all of which are hereby incorporated herein by reference in their entirety.

FIELD OF THE INVENTION

The present application is related generally to wire grid polarizers.

BACKGROUND

Wire grid polarizers may be used for polarizing light, by allowing one polarization to pass through the polarizer, and reflecting or absorbing the opposite polarization. For simplicity, the polarization that primarily passes through will be referred to as p-polarized light and the polarization that primarily reflects or absorbs will be referred to as s-polarized light. For some applications, absorption of s-polarized light is preferred, such as for example if the refection can disrupt the image or other intended use. In a transmissive panel system, reflected light may go back into the LCD Imager causing damage or image degradation, or stray light can reach the screen, degrading contrast. An ideal selectively absorptive wire grid polarizer will transmit all p-polarized light and selectively absorb all s-polarized light. In reality, some s-polarized light is transmitted and some reflected; some p-polarized light is absorbed and some reflected.

The effectiveness of a selectively absorptive wire grid polarizer can be quantified by high transmission of p-polarized light, high absorption of s-polarized light, and high contrast. Contrast is equal to a percent of p-polarized light transmitted (Tp) divided by a percent of s-polarized light transmitted (Ts): Contrast=Tp/Ts.

It can be important in wire grid polarizers for infrared, visible, and ultraviolet light to have small wires with small pitch, such as nanometer or micrometer size and pitch, for effective polarization. Typically, a pitch of less than half of the wavelength of light to be polarized is needed for effective polarization. Smaller pitches may improve the contrast. Thus, small pitch can be an important feature of wire grid polarizers. Manufacture of wire grid polarizers with sufficiently small pitch is challenging, and is a goal of research in this field.

Small wires can be damaged by handling and by environmental conditions. Protection of the wires can be important in wire grid polarizers. Durability of wire grid polarizers is thus another important feature.

For example, see U.S. Pat. Nos. 5,991,075, 6,288,840, 6,665,119, 7,630,133, 7,692,860, 7,800,823, 7,961,393, and 8,426,121; U.S. Patent Publication Numbers US 2008/0055723, US 2009/0041971, and US 2009/0053655; U.S. patent application Ser. No. 13/326,566, filed on Dec. 15, 2011; "Application of 100 Å linewidth structures fabricated by shadowing techniques" by D. C Flanders in J. Vac. Sci. Technol., 19(4), November/December 1981; and "Submicron periodicity gratings as artificial anisotropic dielectrics" by Dale C. Flanders in Appl. Phys. Lett. 42 (6), 15 Mar. 1983, pp. 492-494.

SUMMARY

It has been recognized that it would be advantageous to provide a durable, selectively-absorptive, wire-grid polarizer with high transmission of one polarization, nigh absorption of an opposite polarization, high contrast, and small pitch. The present invention is directed to wire grid polarizers, and methods of making wire grid polarizers, that satisfy these needs. Each of the various embodiments may satisfy one, some, or all of these needs.

The wire grid polarizer can comprise an array of parallel, elongated first rib groups disposed over a transmissive substrate, each first rib group can comprise a central first transmissive rib and a pair of first wires including a first wire disposed along each side of the first transmissive rib. A first dielectric material can substantially fill first gaps between each first rib group and an adjacent first rib group. An array of parallel, elongated second wires can be disposed over the first rib groups and the first dielectric material. The first wires or the second wires can be absorptive and the other can be reflective.

A FIRST METHOD of making a wire grid polarizer can comprise:
1. providing a transmissive substrate having an array of parallel, elongated first transmissive ribs disposed over the substrate;
2. conformal coating the substrate and the first transmissive ribs with a first coating while maintaining solid-material-free first gaps between the first transmissive ribs;
3. etching the first coating to remove horizontal segments and leaving vertical first wires along sides of the first transmissive ribs, forming first rib groups each comprising a pair of first wires which sandwich a first transmissive rib;
4. backfilling the first gaps with first dielectric material;
5. forming a substantially flat, planar top-surface above the first rib groups;
6. applying a continuous thin film of upper-material over the top-surface; and
7. etching the thin film of upper-material to form an array of parallel, elongated second wires disposed over the top-surface, and wherein the first wires or the second wires are absorptive and the other are reflective of the incident light.

A SECOND METHOD of making a wire grid polarizer can comprise steps 1-4 of the FIRST METHOD plus the following additional steps:
5. forming a substantially flat, planar top-surface above the first rib groups;
6. etching the top-surface to form an array of parallel, elongated second transmissive ribs;
7. conformal coating the second transmissive ribs with a second coating while maintaining solid-material-free second gaps between the second transmissive ribs; and
8. etching the second coating to remove horizontal segments and leaving vertical second wires along sides of the second transmissive ribs, forming second rib groups each comprising a pair of second wires which sandwich a second transmissive rib, and wherein the first wires or the second wires comprise are absorptive and the other are reflective of the incident light.

BRIEF DESCRIPTION OF THE DRAWINGS

FIG. 6 is also a schematic cross-sectional side view of an eighth step of the FIRST METHOD for making a wire grid polarizer—backfilling the second gaps 17 and above the second wires 15 with second dielectric material 66—in accordance with an embodiment of the present invention;

FIG. 7 is also a schematic cross-sectional side view of a ninth step of the FIRST METHOD for making a wire grid polarizer—etching the second dielectric material 66 and forming separate second dielectric ribs 66a—in accordance with an embodiment of the present invention;

REFERENCE NUMBERS

Figure 1:
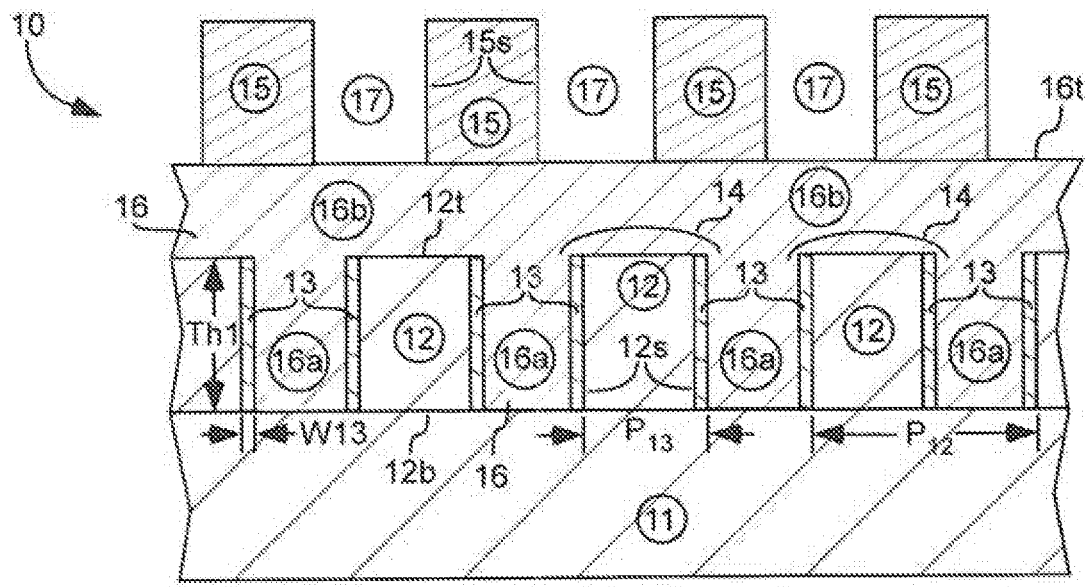
FIG. 1 is a schematic cross-sectional side view of a wire grid polarizer 10 with an array of parallel, elongated first rib groups 14, first dielectric material 16 substantially filling first gaps 117 (see FIGS. 11-13) between the first rib groups 14 to form first dielectric ribs 16a, the first dielectric material 16 further extending from the first gaps 117 above and over tops of the first rib groups 14 forming a first dielectric upper layer 16b, and an array of parallel, elongated second wires 15 disposed over the first rib groups 14, the first dielectric ribs 16a, and the first dielectric upper layer 16b, in accordance with an embodiment of the present invention.

11 Substrate
12 First transmissive rib
12s Sides of the first transmissive rib
13 First wire
14 First rib group
15 Second wire
16 First dielectric material
16a First dielectric rib
16b First dielectric upper layer
16c Transmissive dielectric layer
16t Top-surface
17 Second gap
43 Absorptive wire
45 Reflective wire
66 Second dielectric material
66a Second dielectric rib
66b Second dielectric upper layer
82 Second transmissive rib
82s Sides of the second transmissive rib
84 Second rib group
117 First gap
121 Horizontal segments of the first coating
123 First coating
175 Upper-material
201 Horizontal segments of the second coating
203 Second coating
$P_{12}$ First transmissive rib pitch
$P_{13}$ First wire pitch
$P_{15}$ Second wire pitch
$P_{82}$ Second transmissive rib pitch
Th1 Thickness of the first wire
Th2 Thickness of the second wire
W13 Width of the first wire
W15 Width of the second wire
W123 Width of the first coating
W203 Width of the second coating

DEFINITIONS

Many materials used in optical structures absorb some amount of light, reflect some amount of light, and transmit some amount of light. The following definitions are intended to distinguish between materials or structures that are primarily absorptive, primarily reflective, or primarily transmissive.

1. As used herein, the term "absorptive" means substantially absorptive of light in the wavelength of interest.
   a. Whether a material is "absorptive" is relative to other materials used in the polarizer. Thus, an absorptive structure will absorb substantially more than a reflective or a transmissive structure.
   b. Whether a material is "absorptive" is dependent on the wavelength of interest. A material can be absorptive in one wavelength range but not in another.
   c. In one aspect, an absorptive structure can absorb greater than 40% and reflect less than 60% of light in the wavelength of interest (assuming the absorptive structure is an optically thick film—i.e. greater than the skin depth thickness).
2. As used herein, the term "reflective" means substantially reflective of light in the wavelength of interest.
   a. Whether a material is "reflective" is relative to other materials used in the polarizer. Thus, a reflective structure will reflect substantially more than an absorptive or a transmissive structure.
   b. Whether a material is "reflective" is dependent on the wavelength of interest. A material can be reflective in one wavelength range but not in another. Some wavelength ranges can effectively utilize highly reflective materials. At other wavelength ranges, especially lower wavelengths where material degradation is more likely to occur, the choice of materials may be more limited and an optical designer may need to accept materials with a lower reflectance than desired.
   c. In one aspect, a reflective structure can reflect greater than 80% and absorb less than 20% of light in the wavelength of interest (assuming the reflective structure is an optically thick film—i.e. greater than the skin depth thickness).

3. As used herein, the term "transmissive" means substantially transmissive to light in the wavelength of interest.
   a. Whether a material is "transmissive" is relative to other materials used in the polarizer. Thus, a transmissive structure will transmit substantially more than an absorptive or a reflective structure.
   b. Whether a material is "transmissive" is dependent on the wavelength of interest. A material can be transmissive in one wavelength range but not in another.
   c. In one aspect, a transmissive structure can transmit greater than 90% and absorb less than 10% of light in the wavelength of interest.

4. As used in these definitions, the term "material" refers to the overall material of a particular structure. Thus, a structure that is "absorptive" is made of a material that as a whole is substantially absorptive, even though the material may include some reflective or transmissive components. Thus for example, a rib made of a sufficient amount of absorptive material so that it substantially absorbs light is an absorptive rib even though the rib may include some reflective or transmissive material embedded therein.

5. As used herein, the term "light" can mean light or electromagnetic radiation in the x-ray, ultraviolet, visible, and/or infrared, or other regions of the electromagnetic spectrum.

DETAILED DESCRIPTION

As illustrated in FIG. 1, a wire grid polarizer 10 is shown comprising a transmissive substrate it with an array of parallel, elongated first rib groups 14 disposed over the substrate 11. Each first rib group 14 can comprise a central first transmissive rib 12 and a pair of first wires 13 including a first wire 13 disposed along each side of the first transmissive rib 12. Each pair of first wires 13 can directly touch the central first transmissive rib 12 sandwiched there between; or there may be another material disposed between each pair of first wires 13 and the central first transmissive rib 12.

Figure 11:
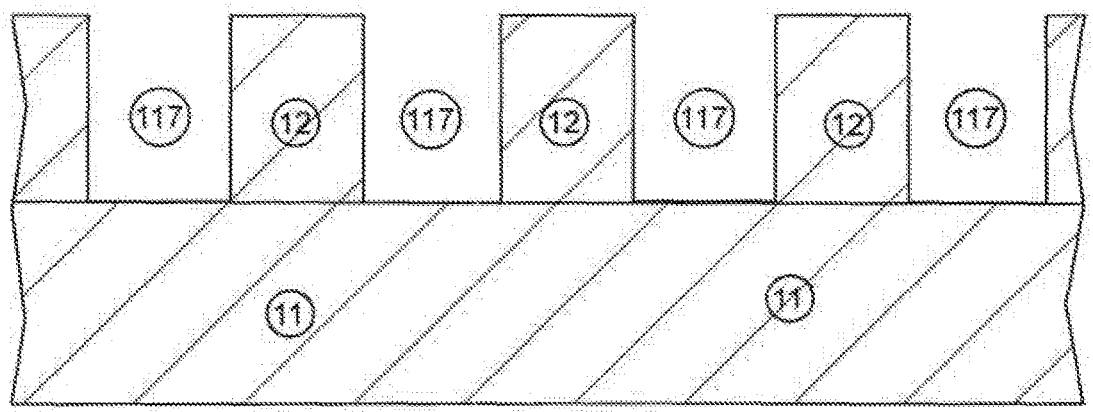
FIG. 11 is a schematic cross-sectional side view of a first step applicable to a FIRST METHOD or to a SECOND METHOD for making a wire grid polarizer—providing a transmissive substrate 11 having an array of parallel, elongated first transmissive ribs 12 disposed over the substrate 11—in accordance with an embodiment of the present invention.
Figure 12:
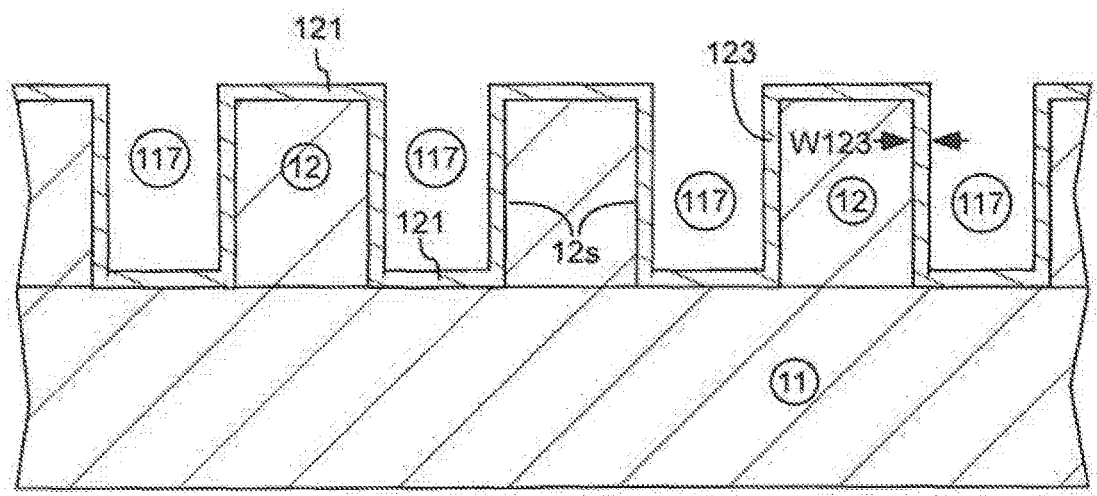
FIG. 12 is a schematic cross-sectional side view of a second step applicable to the FIRST METHOD or to the SECOND METHOD for making a wire grid polarizer—conformal coating the substrate 11 and the first transmissive ribs 12 with a first coating 123 while maintaining solid-material-free first gaps 117 between the first transmissive ribs 12—in accordance with an embodiment of the present invention.
Figure 13:
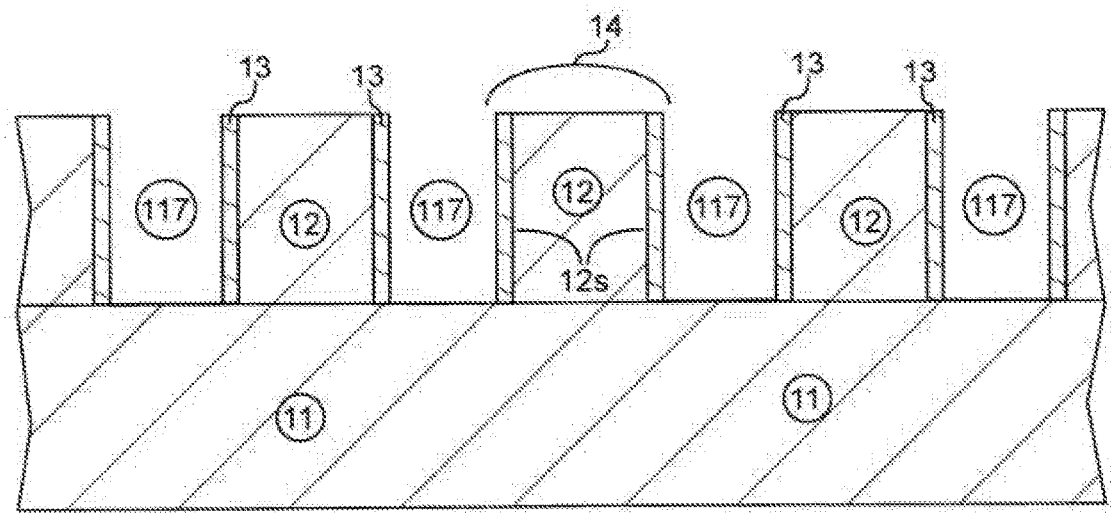
FIG. 13 is a schematic cross-sectional side view of a third step applicable to the FIRST METHOD or to the SECOND METHOD for making a wire grid polarizer—etching the first coating 123 to remove horizontal segments 121 and leaving vertical first wires 13 along sides 12s of the first transmissive ribs 12, forming first rib groups 14 each comprising a pair of first wires 13 which sandwich a first transmissive rib 12—in accordance with an embodiment of the present invention.

A first dielectric material 16 can substantially fill first gaps 117 (see FIGS. 11-13) between each first rib group 14 and an adjacent first rib group 14. All or portions of the first dielectric material 16 can be transmissive. An array of parallel, elongated second wires 15 can be disposed over the first rib groups 14 and the first dielectric material 16. There can be parallel, elongated second gaps 17 between the second wires 15. The second gaps 17 can be disposed on each side 15s of the second wires 15. The second gaps 17 can separate a second wire 15 from adjacent second wires 15 on each side 15s. The second gaps 17 can be solid-material-free and can be filled with air or vacuum. Alternatively, another material can fill the second gaps 17, as will be discussed below in reference to wire grid polarizers 60 and 70 in FIGS. 6-7.

The first transmissive ribs 12 can be integral with, and formed of the same material as, the substrate 11 by etching into the substrate 11 to form the first transmissive ribs 12. Alternatively, the first transmissive ribs 12 can be formed on top of the substrate 11, such as for example, by depositing a transmissive layer on the substrate 11 then etching to form the first transmissive ribs 12. In either case, the first transmissive ribs 12 can be formed by standard lithography techniques, such as patterning a resist and etching for example.

It can be beneficial to have a very small pitch $P_{13}$ or distance between adjacent first wires 13. Although the pitch $P_{12}$ of the first transmissive ribs 12 may be limited by present lithography technology, the present invention teaches how to make two first wires 13 for every first transmissive rib 12; effectively cutting the pitch $P_{13}$ of the first wires approximately in half in comparison to the pitch $P_{12}$ of the first transmissive ribs 12. A pitch $P_{12}$ of the first transmissive ribs 12 can be, for example, less than 200 nanometers in one aspect, less than 150 nanometers in another aspect, or less than 110 nanometers in another aspect; but the pitch $P_{13}$ of the first wires 13 can be approximately half these numbers.

The wire grid polarizers described herein can be made with a relatively high first wire 13 aspect ratio (first wire thickness Th1 divided by first wire width W13). Modeling has shown good polarization characteristics with first wire 13 aspect ratios between 8 and 60. Modeling has shown good polarization characteristics in the visible spectrum with first wire 13 width W of between 5 nm and 20 nm and a thickness Th1 of between 150 nm and 300 nm. The first wires 13 can extend along each side 12s of the transmissive ribs substantially from a bottom of the transmissive ribs to a top of the transmissive ribs.

Figure 2:
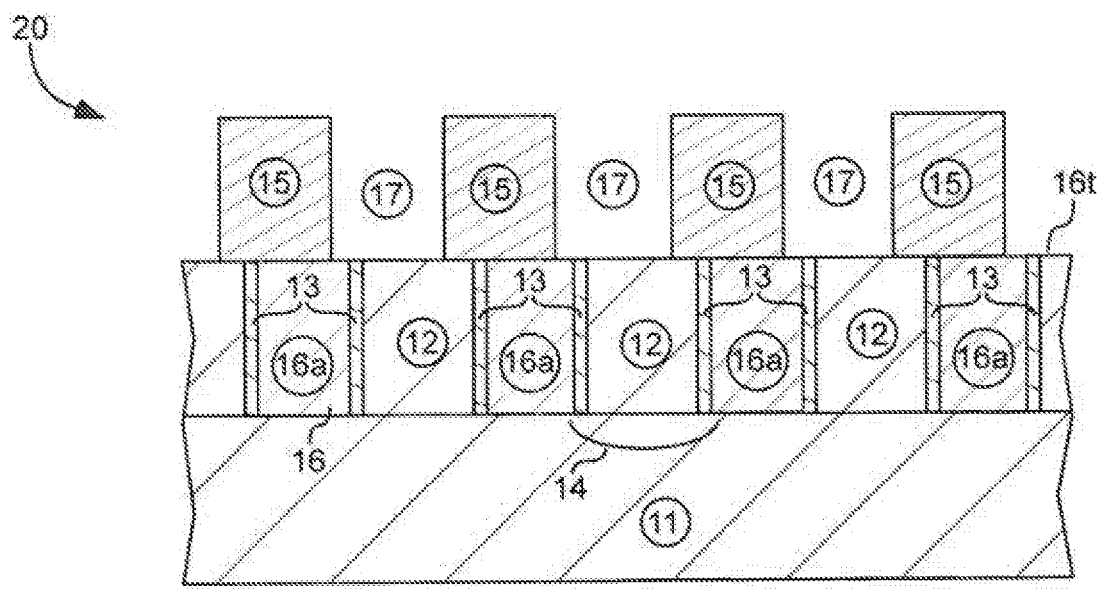
FIG. 2 is a schematic cross-sectional side view of a wire grid polarizer 20 with an array of parallel, elongated first rib groups 14. first dielectric material 16 substantially filling first gaps 117 (see FIGS. 11-13) between the first rib groups 14 to form first dielectric ribs 16a, and an array of parallel, elongated second wires 15 disposed over the first rib groups 14 and the first dielectric ribs 16a, in accordance with an embodiment of the present invention.

The second wires 15 can be disposed over or directly on a top-surface 16t. The top-surface 16t can be first dielectric material 16 only, as shown in FIGS. 1 & 3 or the top-surface 16t can be tops of the first rib groups 14 and tops of first dielectric ribs 16a of the first dielectric material 16 as shown in FIG. 2.

As shown on wire grid polarizer 10 of FIG. 1, the first dielectric material 16 can extend from the first gaps 117 above and over tops of the first rib groups 14. Thus, the first dielectric material 16 can include first dielectric ribs 16a between first rib groups 14 and a first dielectric upper layer 16b above the first rib groups 14. The first dielectric material 16 can have a substantially flat, planar top-surface 16t. The second wires 15 can be disposed on the top-surface 16t.

The first dielectric upper layer 16b can be etched, prior to forming the second wires 15, and can be etched down to tops of the first rib groups 14. The second wires 15 can then be formed on a top-surface 16t comprising tops of the first rib groups 14 and tops of first dielectric ribs 16a. Thus, as shown on wire grid polarizer 20 in FIG. 2, the first dielectric material 16 can form separate first dielectric ribs 16a, with a first dielectric rib 16a in one first gap 117 being separate from a first dielectric rib 16a in an adjacent first gap 117. "Separate" meaning that each first dielectric rib 16a is not connected by the same material to an adjacent first dielectric rib 16a.

Figure 3:
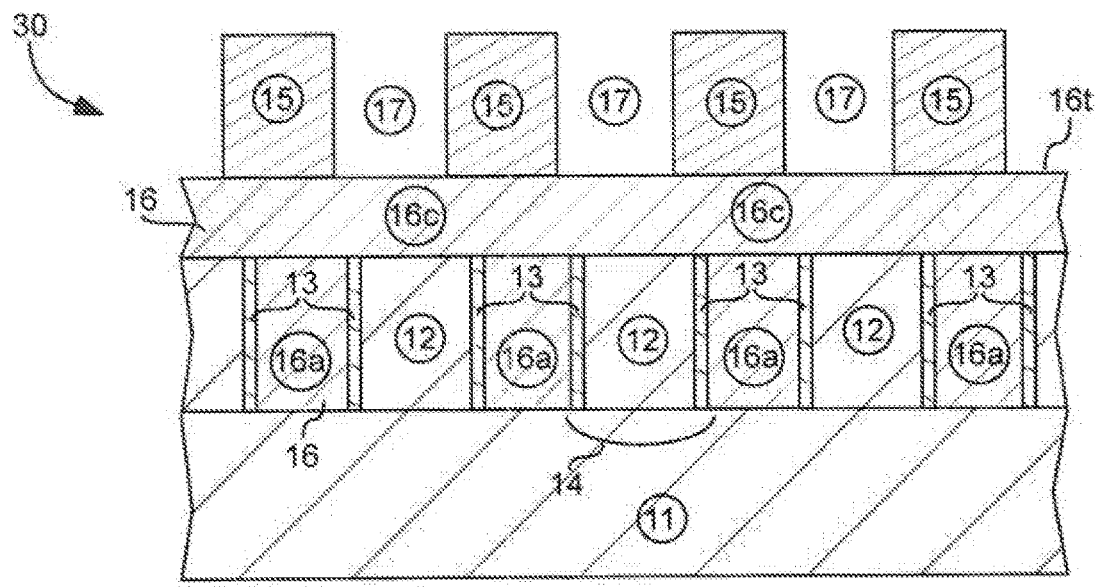
FIG. 3 is a schematic cross-sectional side view of a wire grid polarizer 30 with an array of parallel, elongated first rib groups 14, first dielectric material 16 substantially filling first gaps 117 (see FIGS. 11-13) between the first rib groups 14 to form first dielectric ribs 16a, the first dielectric material 16 further extending from the first gaps 117 above and over tops of the first rib groups 14 forming a transmissive dielectric layer 16c, the first dielectric material 16 of the dielectric ribs 16a comprising a different material than the first dielectric material 16 of the transmissive dielectric layer 16c, and an array of parallel, elongated second wires 15 disposed over the first rib groups 14 and on a top-surface 16t of the transmissive dielectric layer 16c, in accordance with an embodiment of the present invention.

First dielectric ribs 16a are also separate from each other on wire grid polarizer 30 in FIG. 3, with a first dielectric rib 16a in one first gap 117 being separate from a first dielectric rib 16a in an adjacent first gap. A difference between wire grid polarizer 20 and 30 is that on polarizer 30, a transmissive dielectric layer 16c is disposed between (i) tops of the first rib groups 14 and tops of the first dielectric ribs 16a and (ii) bottoms of the second wires 15. The transmissive dielectric layer 16c can have a substantially flat, planar, top-surface 16t.

To make wire grid polarizer 30, the first dielectric upper layer 16b can be etched, prior to forming the second wires 15, and can be etched down to tops of the first rib groups 14. The transmissive dielectric layer 16c can then be applied, such as for example by chemical vapor deposition, physical vapor deposition, or spin on. The second wires 15 can then be formed on a top-surface 16*t* of the transmissive dielectric layer 16*c*.

The transmissive dielectric layer 16*c* may be desired in some designs for modifying optical characteristics or for increased structural strength. A thickness of the transmissive dielectric lave 16*c* can be adjusted for optimal optical properties.

A choice of polarizer 10, 20, or 30 can be made based on overall performance requirements, such as for example a required Tp, Ts, Rs, for the wavelength range, materials used, durability requirements, and manufacturing cost. Polarizer 10 can have an advantage of less manufacturing steps than required to make polarizers 20 and 30. Polarizers 20 and 30 can have the advantage of having the first dielectric ribs 16*a* separate from each other. With such separation of the first dielectric ribs 16*a*, these ribs can affect polarization. For example, the first dielectric ribs 16*a* can be absorptive and can be used to selectively absorb one polarization of light.

The first wires 13 or the second wires 15 can be absorptive (absorptive wires 43) and the other of the first wires 13 or the second wires 15 can be reflective (reflective wires 45). The reflective wires 45 can cause polarization of incident light and the absorptive wires can cause absorption, rather than reflection, of one polarization (thus selectively absorptive) of the incident light.

Figure 4:
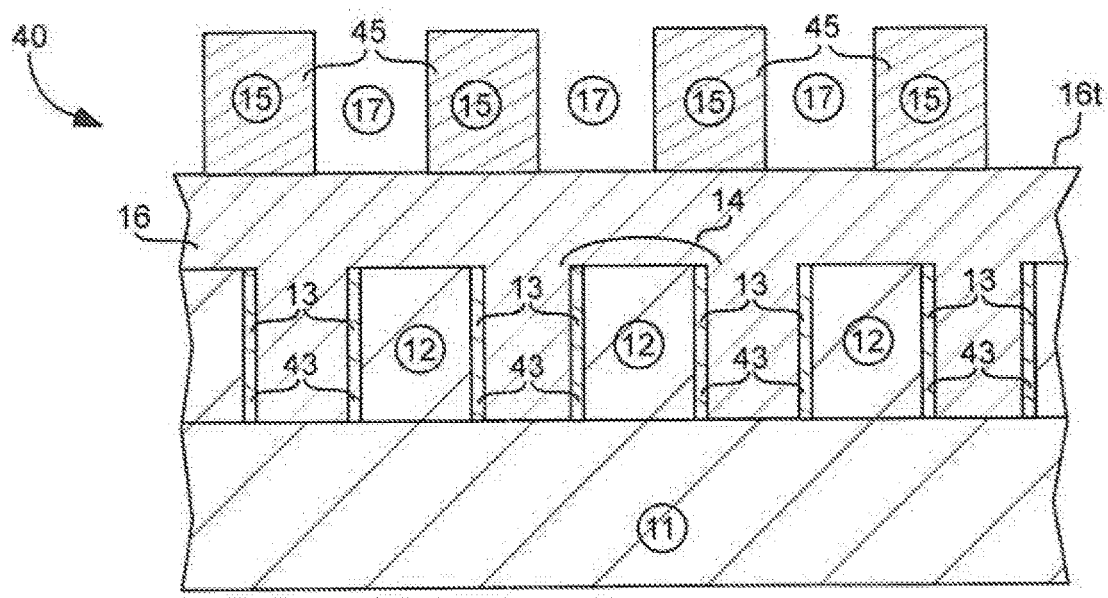
FIG. 4 is a schematic cross-sectional side view of a wire grid polarizer 40 similar to one of the wire grid polarizers shown in FIGS. 1-3 and 6-10, wherein the first wires 13 are absorptive wires 43 and the second wires 15 are reflective wires 45, in accordance with an embodiment of the present invention.
Figure 5:
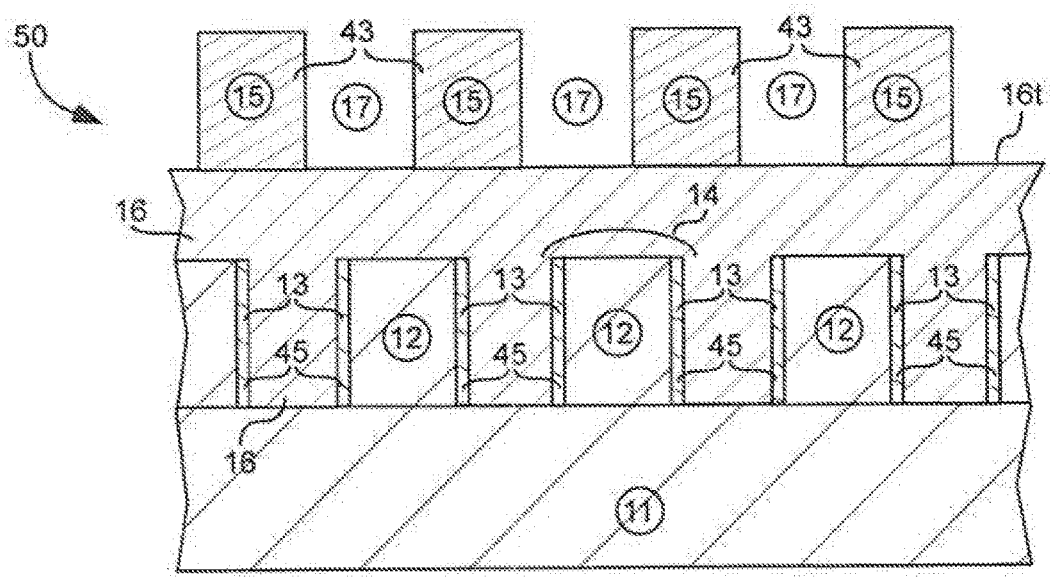
FIG. 5 is a schematic cross-sectional side view of a wire grid polarizer 50 similar to one of the wire grid polarizers shown in FIGS. 1-3 and 6-10, wherein the first wires 13 are reflective wires 45 and the second wires 15 are absorptive wires 43, in accordance with an embodiment of the present invention.

As shown on wire grid polarizer 40 in FIG. 4, the first wires 13 can be absorptive wires 43 and the second wires 15 can be reflective wires 45. As shown on wire grid polarizer 50 in FIG. 5, the first wires 13 can be reflective wires 45 and the second wires 15 can be absorptive wires 43. Whether the first wires 13 or the second wires 15 are the reflective wires 45 or absorptive wires 43 can depend on factors such as desired pitch of reflective wires 45 and absorptive wires 43, direction of incident light, and overall materials of construction.

Figure 6:
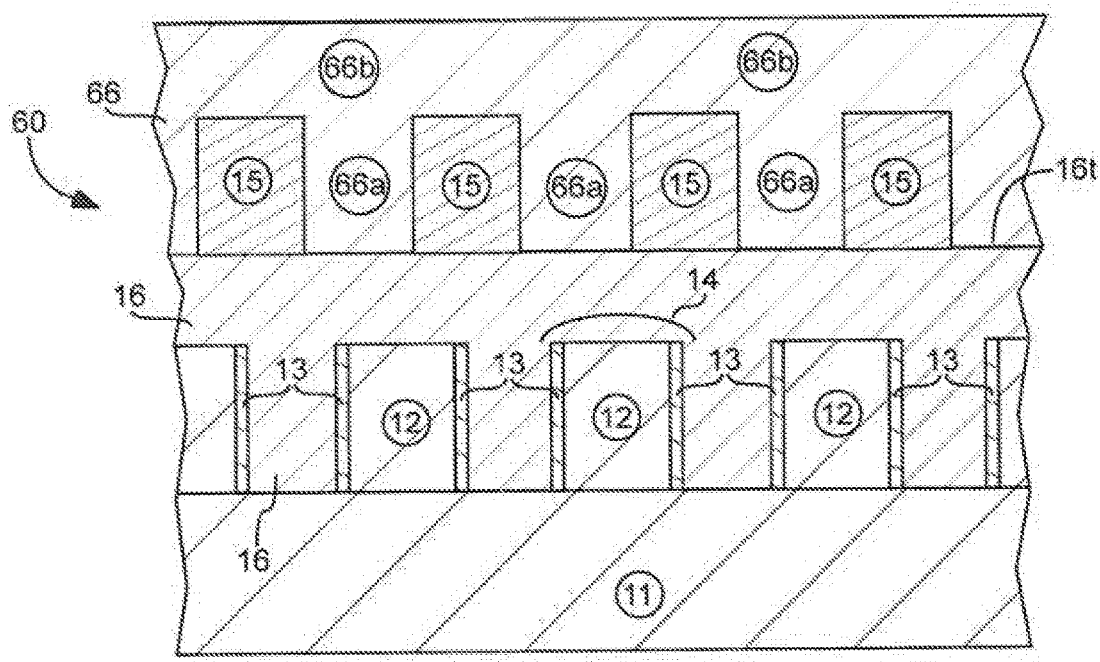
FIG. 6 is a schematic cross-sectional side view of a wire grid polarizer 60 similar to one of the embodiments of FIGS. 1-5, further comprising second dielectric material 66 substantially filling second gaps 17 (see FIGS. 1-5) between the second wires 15 to form second dielectric ribs 66a, the second dielectric material 66 further extending from the second gaps 17 above and over tops of the second wires 15 forming a second dielectric upper layer 66b, in accordance with an embodiment of the present invention.
Figure 7:
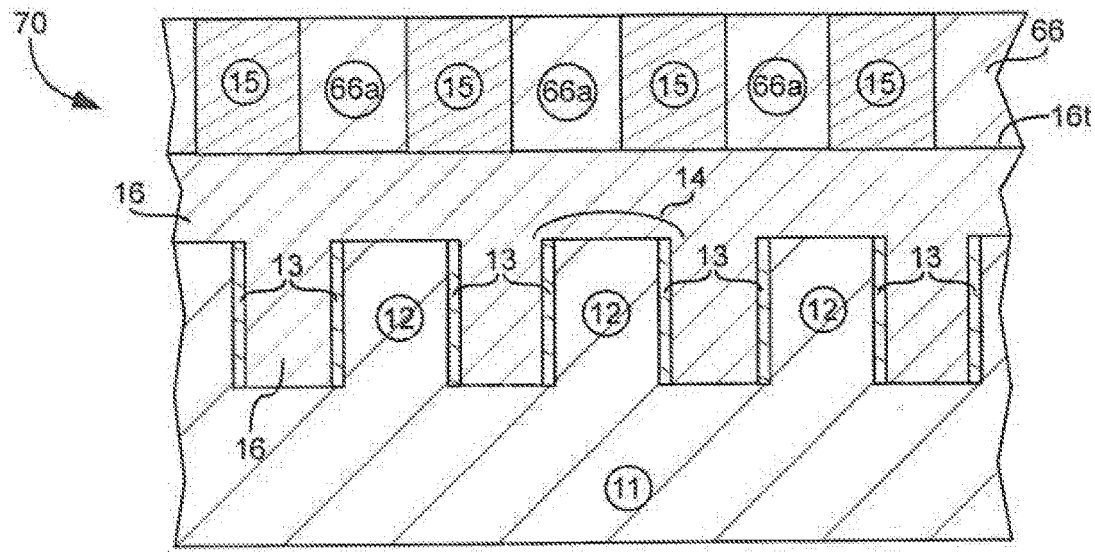
FIG. 7 is a schematic cross-sectional side view of a wire grid polarizer 70, similar to one of the embodiments of FIGS. 1-5, further comprising second dielectric material 66 substantially filling second gaps 17 (see FIGS. 1-5) between the second wires 15 to form second dielectric ribs 66a, in accordance with an embodiment of the present invention.

As shown on wire grid polarizer 60 in FIG. 6, a second dielectric material 66 can substantially fill gaps 17 (see FIGS. 1-5) between the second wires 15, forming second dielectric ribs 66*a*. The second dielectric material 66 can extend from the second gaps 17 above and over tops of the second wires 15. Thus, the second dielectric material 66 can include second dielectric ribs 66*a* and a second dielectric upper layer 66*b* above the second wires 15. As shown on wire grid polarizer 70 in FIG. 7, the second dielectric material 66 can be etched down to tops of the second wires 15, thus forming separate second dielectric ribs 66*a*, with a second dielectric rib 66*a* filling one gap 17 being separate from a second dielectric rib 66*a* filling an adjacent gap 17.

A choice of polarizer 60 or 70 can depend on manufacturing cost considerations, durability, and whether there is a need to separate one second dielectric rib 66*a* from another. On polarizer 60, the second wires 15 are fully embedded, which can be beneficial if there is a concern of corrosion of the second wires 15. On polarizer 70, the second dielectric ribs 66*a* are separate from each other, with can be beneficial if the second dielectric ribs 66*a* are used for separation of the different polarization states, or for absorption of one polarization state. For example, one of the second wires 15 or the second dielectric ribs 66*a* can be reflecting structures and the other can be absorptive structures.

Figure 8:
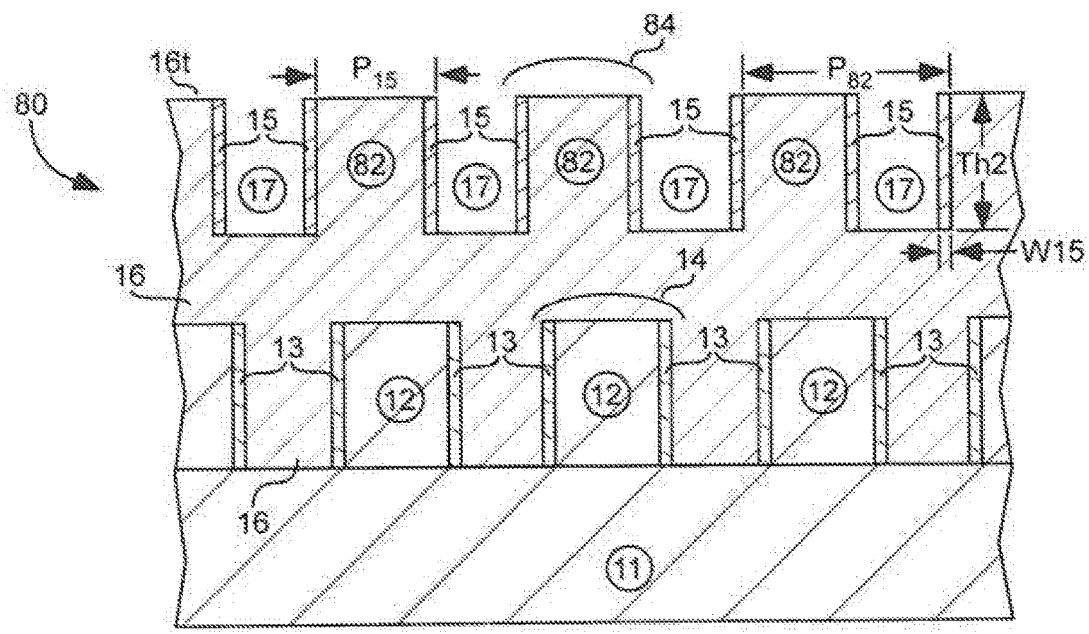
FIG. 8 is a schematic cross-sectional side view of a wire grid polarizer 80 similar to one of the embodiments shown in FIGS. 1-5, except that the second wires 15 are part of an array of parallel, elongated second rib groups 84 each comprising a central second transmissive rib 82 and a second wire 15 disposed along each side of the second transmissive rib 82, in accordance with an embodiment of the present invention.
Figure 9:
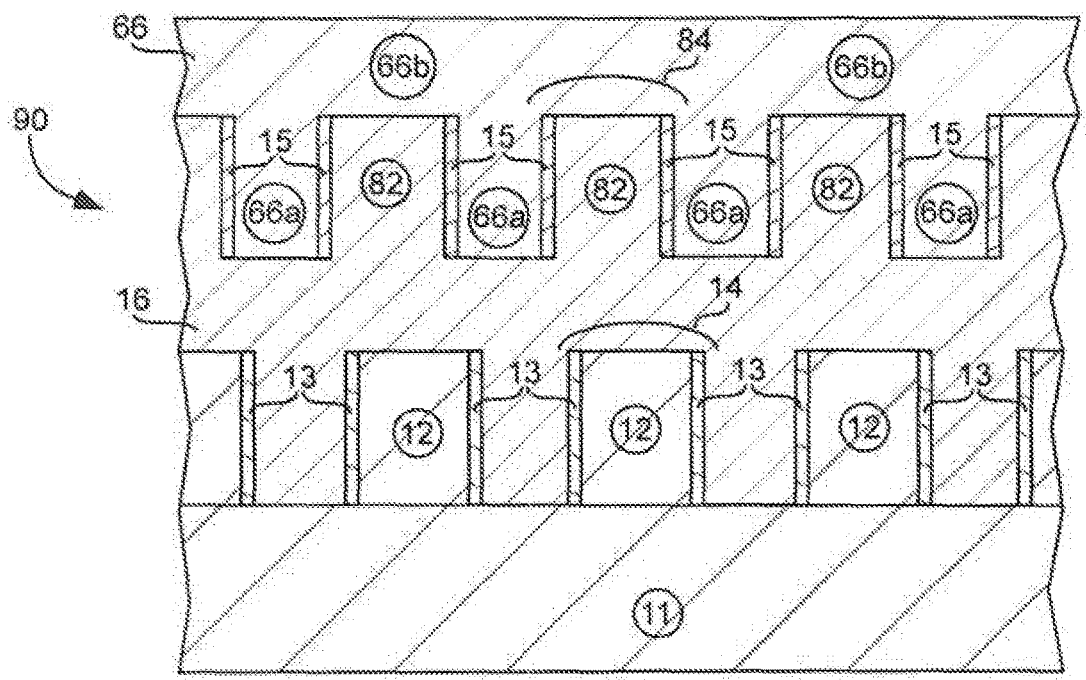
FIG. 9 is a schematic cross-sectional side view of a wire grid polarizer 90, similar to wire grid polarizer 80, further comprising a second dielectric material 66 substantially filling second gaps 17 (see FIG. 8) between the second rib groups 84 to form second dielectric ribs 66a, the second dielectric material 66 further extending from the second gaps 17 above and over tops of the second rib groups 84 forming a second dielectric upper layer 66b, in accordance with an embodiment of the present invention.
Figure 10:
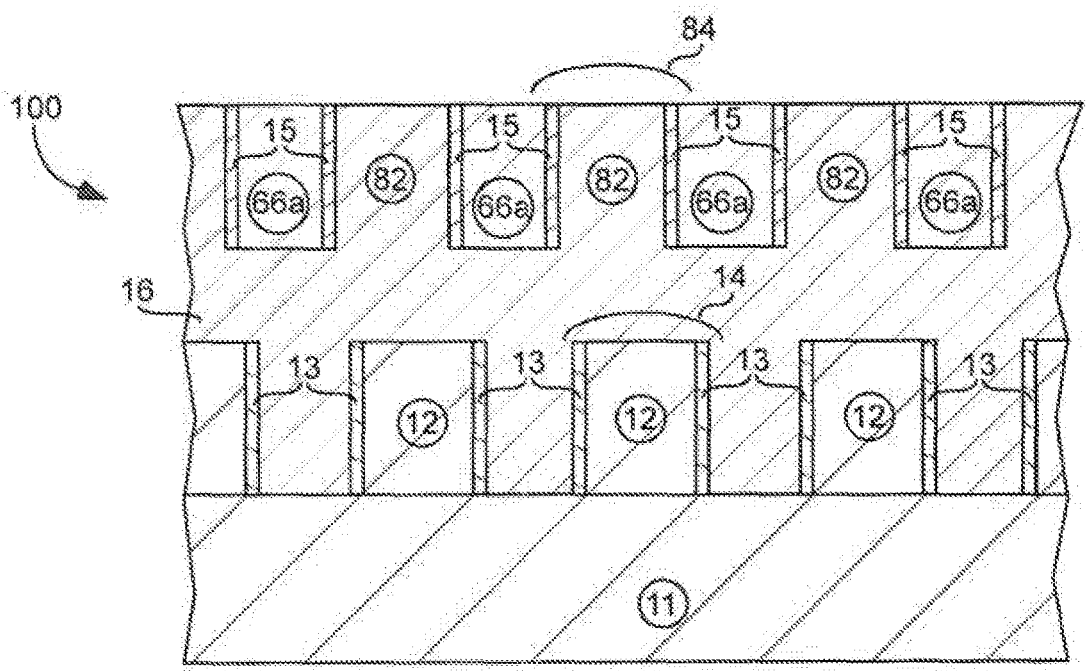
FIG. 10 is a schematic cross-sectional side view of a wire grid polarizer 100, similar to wire grid polarizer 80, further comprising a second dielectric material 66 substantially filling second gaps 17 (see FIG. 8) between the second rib groups 84 to form second dielectric ribs 66a, in accordance with an embodiment of the present invention.

As shown on polarizers 80, 90, and 100 in FIGS. 8-10, the second wires 15 can be part of an array of parallel, elongated second rib groups 84. Each second rib group 84 can comprise a central second transmissive rib 82 and a pair of the second wires 15. A second wire 15 can be disposed along each side of the second transmissive rib 82. There can be second gaps 17 between each second rib group 84 and an adjacent second rib group 84. The second wires 15 can extend along each side of the second transmissive ribs 82 substantially from a bottom of the second transmissive ribs 82 to a top of the second transmissive ribs 82. The second transmissive ribs 82 can be formed in the top-surface 16*t* by by etching the first dielectric material 16, or by etching a thin film disposed over the first dielectric material 16. On polarizers 80, 90, and 100, the first dielectric material 16 can be a single layer, or multiple layers, similar to the description of the first dielectric material 16 above for polarizers 10, 20, and 30.

On polarizers 80, 90, and 100, the first wires 13 or the second wires 15 can be absorptive and the other can be reflective. Thus, the description of polarizers 40 and 50 is applicable to polarizers 80, 90, and 100.

As shown in FIGS. 9-10, a second dielectric material 66 can substantially fill the second gaps 17 (see FIG. 8) between each second rib group 84 and an adjacent second rib group 84. As shown on wire grid polarizer 90 of FIG. 9, the second dielectric material 66 can extend from the second gaps 17 above and over tops of the second rib groups 84. Thus, the second dielectric material 66 can include second dielectric ribs 66*a* between second rib groups 84 and a second dielectric upper layer 66*b* above the second rib groups 84. The second dielectric material 66 can be a single layer and can be a single material; or the second dielectric material 66 can be multiple layers and can be layers of different materials.

The second dielectric upper layer 66*b* can be etched down to tops of the second rib groups 84. Thus, as shown on wire grid polarizer 100 in FIG. 10, the second dielectric material 66 can form separate second dielectric ribs 66*a*, with a second dielectric rib 66*a* in one second gap 17 being separate from a second dielectric rib 66*a* in an adjacent second gap 17. "Separate" meaning that each second dielectric rib 66*a* is not connected by the same material to an adjacent second dielectric rib 66*a*. Having separate second dielectric ribs 66*a* can allow such ribs to have a polarizing function. For example, the second dielectric ribs 66*a* can separate light into different polarization states if it is reflective, can selectively absorb one polarization state if absorptive, or can act as a birefringent transmissive thin film if made of transmissive material.

A choice of polarizer 80, 90, or 100 can depend on manufacturing cost considerations, durability requirements, and whether there is a need to separate one second dielectric rib 66*a* from another. Polarizer 80 has the benefits of (1) at least one less manufacturing step than polarizers 90 and 100, and (2) air in the second gaps 17 can improve Tp in some designs. Polarizers 90 and 100 can have better durability over polarizer 80. On polarizer 90, the second wires 15 are fully embedded, which can be beneficial if there is a concern of corrosion of the second wires 15. On polarizer 100, the second wires 15 are mostly embedded, which may be sufficient corrosion protection if the environment is not too corrosive. On polarizer 100, the second dielectric ribs 66*a* are separate from each other, with can be beneficial if the second dielectric ribs 66*a* are used for separation of the different polarization states, or for absorption of one polarization state. For example, one of the second wires 15 or the second dielectric ribs 66*a* can be reflective and the other can be absorptive.

The second transmissive ribs 82 can be formed by standard lithography techniques, such as patterning a resist and etching for example. It can be beneficial to have a very small pitch P$_{15}$ or distance between adjacent second wires 15. Although the pitch P$_{82}$ of the second transmissive ribs 82 may be limited by present technology, the present invention teaches how to make two second wires 15 for every second transmissive rib 82; effectively cutting the pitch P$_{15}$ of the second wires in half in comparison to the pitch P$_{82}$ of the second transmissive ribs 82. A pitch P$_{82}$ of the second transmissive ribs 82 can be, for example, less than 200 nanometers in one aspect, less than 150 nanometers in another aspect, or less than 110 nanometers in another aspect; but the pitch P$_{15}$ of the second wires 15 can be approximately half these numbers.

The wire grid polarizers 80, 90, 100 can be made with a relatively high second wire 15 aspect ratio (second wire thickness Th2 divided by second wire width W15). Modeling has shown good polarization characteristics with second wire 15 aspect ratios between 8 and 60. Modeling has shown good polarization characteristics in the visible spectrum with second wire 15 width W of between 5 nm and 20 nm and a thickness Th1 of between 150 nm and 300 nm.

First Method (FIGS. 11-18 & 6-7)

Figure 14:
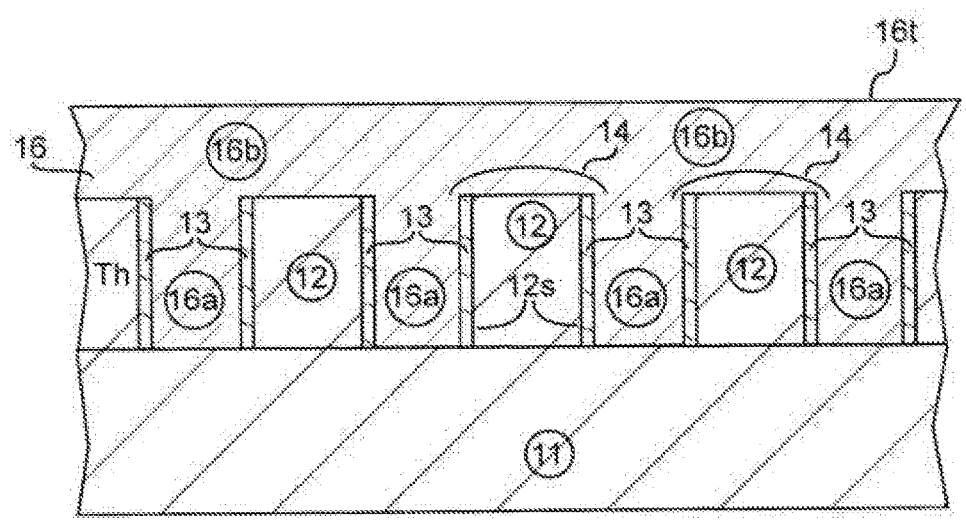
FIG. 14 is a schematic cross-sectional side view related to a fourth and/or fifth step in the FIRST METHOD or the SECOND METHOD for making a wire grid polarizer—backfilling the first gaps 117 and above the first rib groups 14 with first dielectric material 16 and forming a substantially flat, planar top-surface 16t above the first rib groups 14—in accordance with an embodiment of the present invention.
Figure 15:
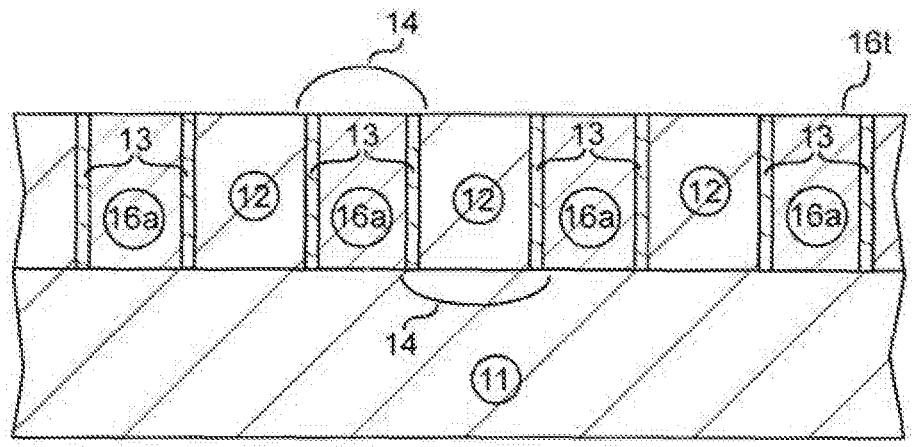
FIG. 15 is a schematic cross-sectional side view related to a fourth and/or fifth step in the FIRST METHOD or the SECOND METHOD for making a wire grid polarizer—etching the first dielectric material 16 and forming separate first dielectric ribs 16a, with a first dielectric rib 16a in one first gap 117 separate from a first dielectric rib in an adjacent first gap 117, and forming the substantially flat, planar top-surface 16t above the first rib groups 14 and the first dielectric ribs—in accordance with an embodiment of the present invention.
Figure 16:
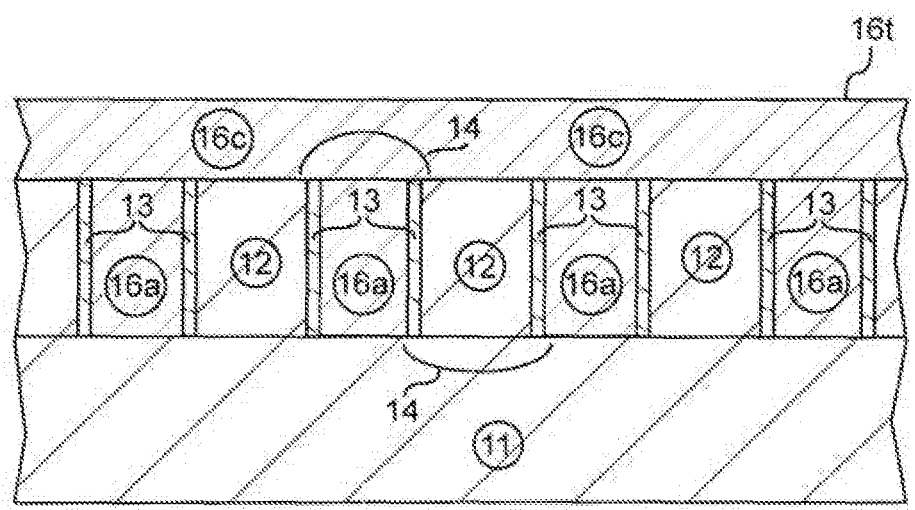
FIG. 16 is a schematic cross-section a I side view related to a fourth and/or fifth step applicable to the FIRST METHOD or to the SECOND METHOD for making a wire grid polarizer—applying a transmissive dielectric layer 16c over the first rib groups 14 and the first dielectric ribs 16a to form the substantially flat, planar top-surface 16t with material of the transmissive dielectric layer 16c—in accordance with an embodiment of the present invention.
Figure 17:
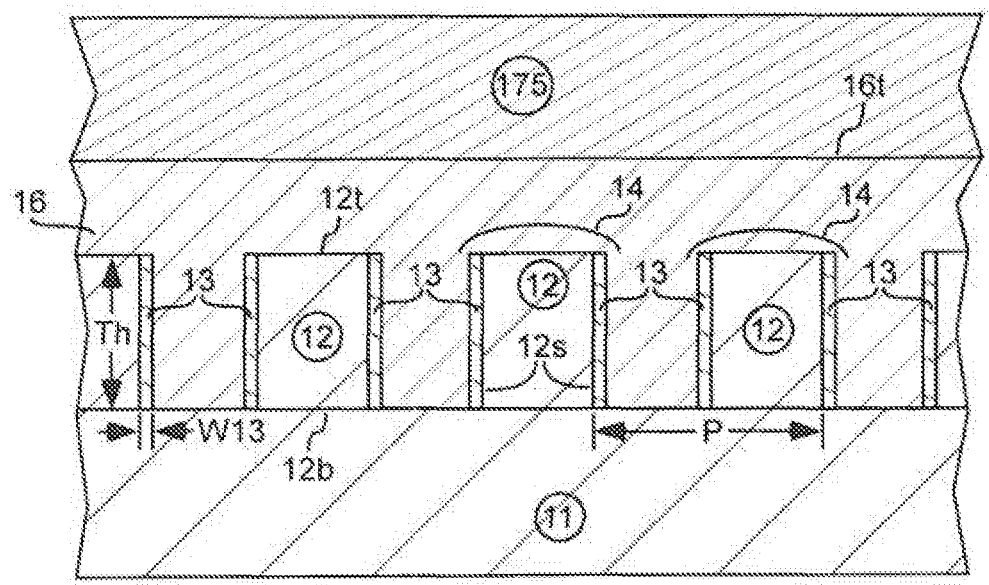
FIG. 17 is a schematic cross-sectional side view of a sixth step of the FIRST METHOD for making a wire grid polarizer—applying a continuous thin film of upper-material 175 over the top-surface 16t of the first dielectric material 16—in accordance with an embodiment of the present invention.
Figure 18:
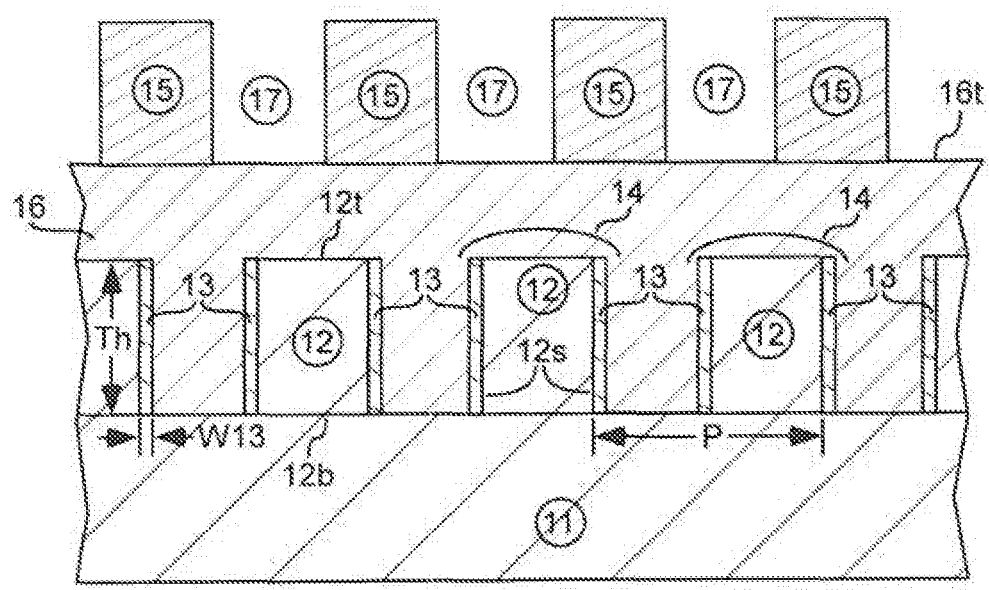
FIG. 18 is a schematic cross-sectional side view of a seventh step of the FIRST METHOD for making a wire grid polarizer—etching the thin film of upper-material 175 to form an array of parallel, elongated second wires 15 disposed over the top-surface 16t—in accordance with an embodiment of the present invention.
Figure 19:
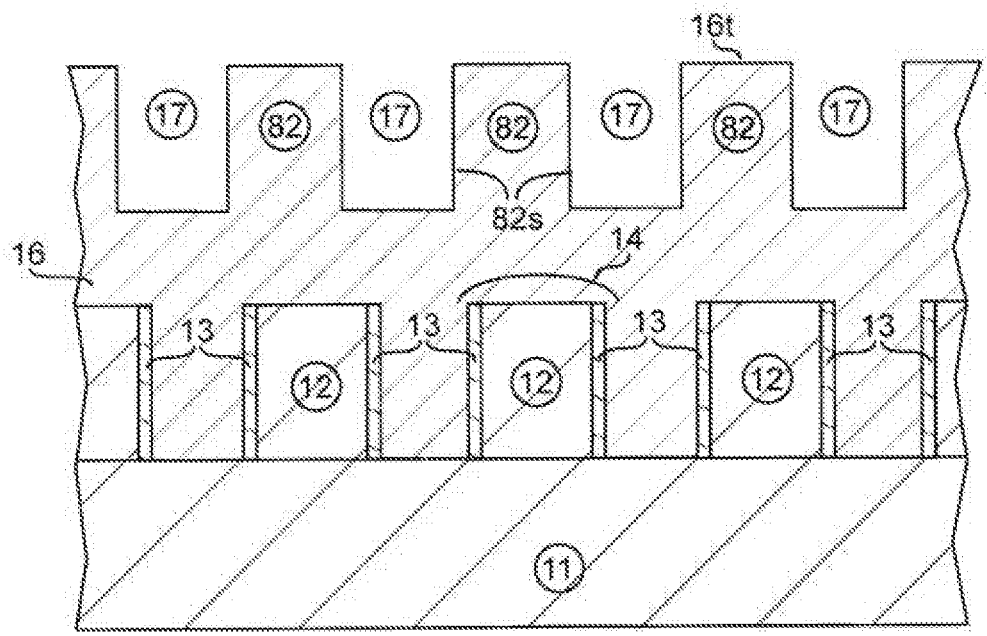
FIG. 19 is a schematic cross-sectional side view of a sixth step of the SECOND METHOD for making a wire grid polarizer—etching the top-surface 16t to form an array of parallel, elongated second transmissive ribs 82—in accordance with an embodiment of the present invention.
Figure 20:
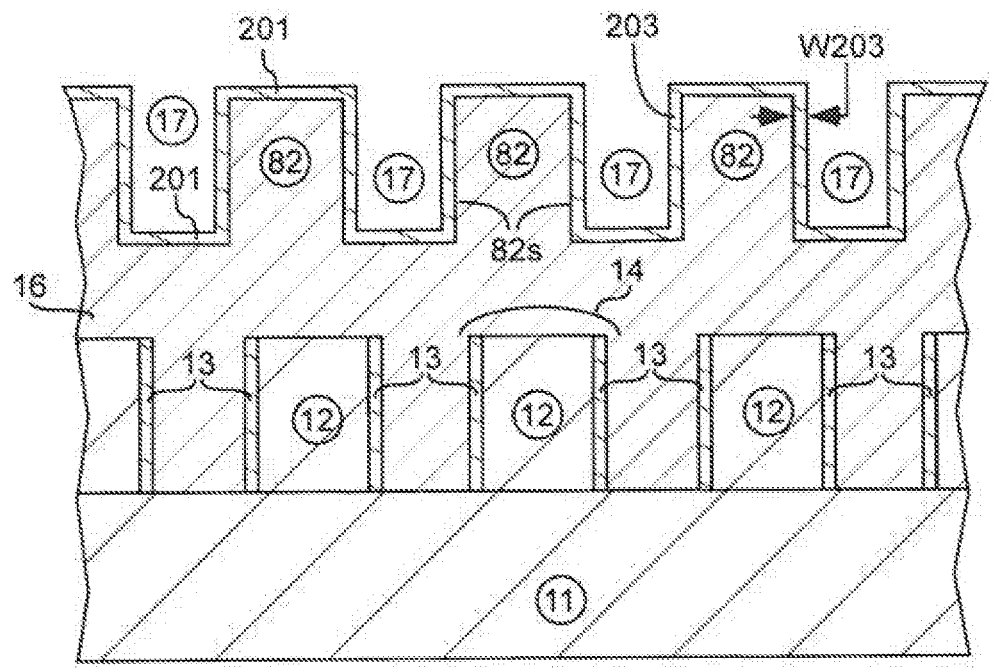
FIG. 20 is a schematic cross-sectional side view of a seventh step of the SECOND METHOD for making a wire grid polarizer—conformal coating the second transmissive ribs 82 with a second coating 203 while maintaining solid-material-free second gaps 17 between the second transmissive ribs 82—in accordance with an embodiment of the present invention.
Figure 21:
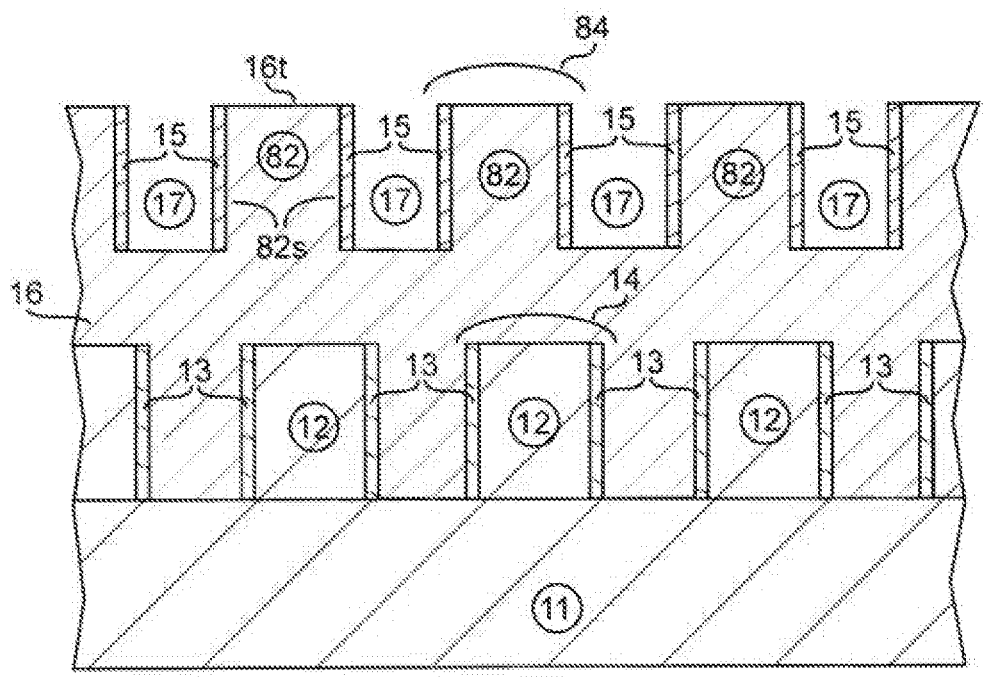
FIG. 21 is a schematic cross-sectional side view of a eighth step of the SECOND METHOD for making a wire grid polarizer—etching the second coating 203 to remove horizontal segments 201 and leaving vertical second wires 15 along sides 82s of the second transmissive ribs 82, forming second rib groups 84 each comprising a pair of second wires 15 which sandwich a second transmissive rib 82—in accordance with an embodiment of the present invention.
Figure 22:
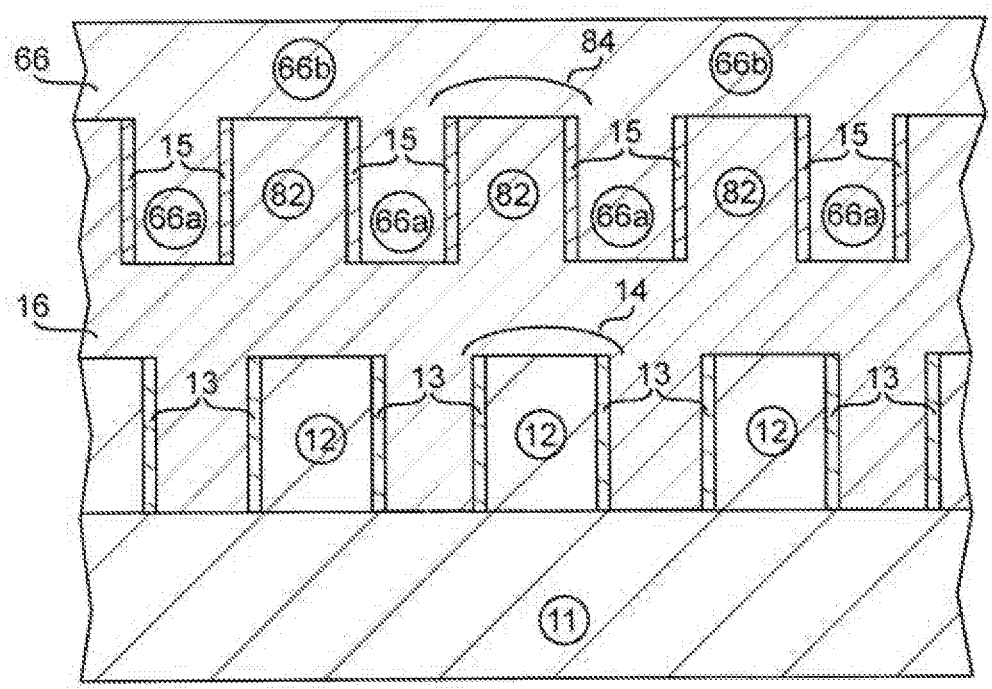
FIG. 22 is a schematic cross-sectional side view of a ninth step of the SECOND METHOD for making a wire grid polarizer—backfilling the second gaps 17 and extending above the second rib groups 84 with second dielectric material 66—in accordance with an embodiment of the present invention.
Figure 23:
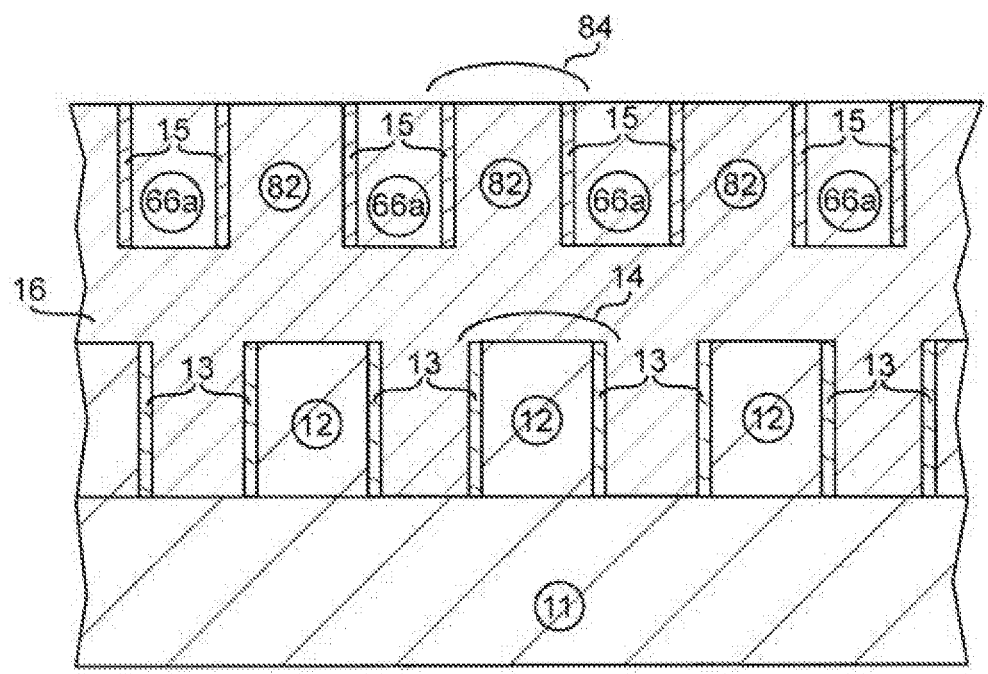
FIG. 23 is a schematic cross-sectional side view of a tenth step of the SECOND METHOD for making a wire grid polarizer—etching the second dielectric material 66 and forming separate second dielectric ribs 66a, with a second dielectric rib 66a in one second gap 17 separate from a second dielectric rib 66a in an adjacent second gap 17—in accordance with an embodiment of the present invention.

A first method of making a wire grid polarizer can comprise some or all of the following steps. The steps can be performed in the order shown.
1. Providing a transmissive substrate 11 having an array of parallel, elongated first transmissive ribs 12 disposed over the substrate 11. There can be an array of parallel, elongated solid-material-free first gaps 117 between the first transmissive ribs 12. See FIG. 11.
2. Conformal coating the substrate 11 and the first transmissive ribs 12 with a first coating 123 while maintaining the solid-material-free first gaps 117 between the first transmissive ribs 12. The conformal coating can be done by atomic layer deposition or other conformal coating method. A width W123 of the first coating 123 can be approximately equal to a width W13 of the first wires 13. See FIGS. 1 & 12.
3. Etching the first coating 123 to remove horizontal segments 121 and leaving vertical first wires 13 along sides of the first transmissive ribs 12, forming first rib groups 14 each comprising a pair of first wires 13 which sandwich a first transmissive rib 12. The etch can be an anisotropic etch to preferentially remove horizontal segments 121 while leaving vertical first wires 13. See FIGS. 12-13.
4. Backfilling the first gaps 117 and above the first rib groups 14 with the first dielectric material 16. The backfilling can be done by various methods including spinning on a liquid material (e.g. spin-on glass), then baking to drive out volatile chemicals and harden. The backfilling can be done by atomic lay deposition. See FIG. 14.
5. Forming a substantially flat, planar top-surface 16*t* above the first rib groups 14. Formation of this top-surface 16*t* may be done by various methods, including the following:
   a. The first dielectric material 16 can form the substantially flat, planar top-surface 16*t* as shown in FIG. 14. Thus, this formation is a completion of the process of step 4.
   b. An additional layer of material can be added on top of the first dielectric material, and a top-surface of this additional layer can form the top-surface 16*t*.
   c. Etching the first dielectric material 16 and forming separate first dielectric ribs 16*a*. The substantially flat, planar top-surface 16*t* can comprise tops of the rib groups 14 and tops of the first dielectric ribs 16*a*. See FIG. 15.
   d. Etching the first dielectric material 16 and forming separate first dielectric ribs 16*a*. Applying a transmissive dielectric layer 16*c*, substantially transmissive to incident light, over the first rib groups 14 and the first dielectric ribs 12 to form the substantially flat, planar top-surface 16*t* with material of the transmissive dielectric layer 16*c*. See FIG. 16.
6. Applying s continuous thin film of upper-material 175 over the top-surface 16*t*. See FIG. 17.
7. Etching the thin film of upper-material 175 to form an array of parallel, elongated second wires 15 disposed over the top-surface 16*t* of the first dielectric material 16 and solid-material-free second gaps 17 between the second wires 15. See FIG. 18.
8. Backfilling the second gaps 17 and above the second wires 15 with second dielectric material 66. Backfilling may be done as described above in step 4. See FIG. 6.
9. Etching the second dielectric material 66 and forming separate second dielectric ribs 66*a*. See FIG. 7.

The first coating 123 and the first wires 13 or the thin film of upper-material 175 and the second wires 15 can be absorptive and the other can be reflective.

Second Method (FIGS. 11-16 & 19-23)

A second method of making a wire grid polarizer can compose some or all of the following steps. The steps can be performed in the order shown. Steps 1-4 from the first method above.
5. Forming a substantially flat, planar top-surface 16*t* above the first rib groups 14. Formation of this top-surface 16*t* may be done by various methods, including the following:
   a. The first dielectric material 16 can form the substantially flat, planar top-surface 16*t* as shown in FIG. 14. Thus, this formation is a completion of the process of step 4.
   b. An additional layer of material can be added on top of the first dielectric material 16. A top-surface of this additional layer can form the top-surface 16*t*.
   c. Etching the first dielectric material 16 and forming separate first dielectric ribs 16*a*. Applying a transmissive dielectric layer 16*c*, substantially transmissive to incident light, over the first rib groups 14 and the first dielectric ribs 12 to form the substantially flat, planar top-surface 16*t* with material of the transmissive dielectric layer 16*c*. See FIG. 16.
6. Etching the top-surface 16*t* to form an array of parallel, elongated second transmissive ribs 82. The second transmissive ribs 82 can be substantially transmissive to incident light. See FIG. 19. Note that FIGS. 19-23 show formation of the second transmissive ribs 82 in the first dielectric material 16, but as noted in step 5, the second transmissive ribs 82 might be formed in another material above the first dielectric material 16.
7. Conformal coating the second transmissive ribs 82 with a second coating 203 while maintaining solid-material-free second gaps 17 between the second transmissive ribs 82. A width W203 of the second coating 203 can be approximately equal to a width W15 of the second wires 15. See FIGS. 8 & 20.
8. Etching the second coating 203 to remove horizontal segments 201 and leaving vertical second wires 15 along sides of the second transmissive ribs 82, forming second rib groups 84 each comprising a pair of second wires 15 which sandwich a second transmissive rib 82. See FIGS. 20-21.
9. Backfilling the second gaps 17 with second dielectric material 66 substantially filling the second gaps 17 and extending above the second rib groups 84. See FIG. 22.
10. Etching the second dielectric material 66 and forming separate second dielectric ribs 66*a*, with a second dielectric rib 66a in one second gap 17 separate from a second dielectric rib 66a in an adjacent second gap 17. See FIG. 23.

The first coating 123 and the first wires 13 or the second coating 203 and the second wires 15 can be absorptive and the other can be reflective.

General Information for All Embodiments

U.S. patent application Ser. No. 13/326,566, filed on Dec. 15, 2011; and U.S. Pat. Nos. 7,570,424 and 7,961,393; incorporated herein by reference in their entirety, provide examples of possible substrate 11 materials, dielectric materials, absorptive materials, and materials for polarization (i.e. reflective materials) for the various polarizer structures and methods described herein. For example, aluminum could be used as a material for the reflective wires 45 to polarize visible light and silicon could be used as a material for absorptive wires 43 to selectively absorb one polarization of visible light. The choice of material is dependent on the wavelength range of desired polarization, the overall polarizer structure, durability requirements, and performance requirements.

Note that a material's interaction with light (i.e. whether the material is primarily absorptive, reflective, or transmissive) is not solely dependent on elements in the material, but also on crystal structure and stoichiometry. These characteristics of different materials for use in polarizers are discussed extensively in U.S. Pat. Nos. 7,570,424 and 7,961,393.

The first wires 13 and the second wires 15 are partially or fully embedded in some of the embodiments described herein. Although embedding wires of a wire grid polarizer can increase wire grid polarizer durability, embedding the wires in some polarize designs can also adversely affect wire grid polarizer performance, especially by decreasing transmission of p-polarized light (decrease Tp). Therefore, embedded wire grid polarizers have often not been implemented in practice for applications requiring high polarizer performance, such as for example in computer projectors or semiconductor analysis equipment. Modeling has shown that the specific designs shown herein, although wires are partially or completely embedded, especially combined with proper aspect ratio, can provide good wire grid polarizer performance.

Examples of polarizer performance that may be obtained with polarizers described herein, and polarizers made from methods described herein, include:

1. transmission of at least 90% of one polarization (e.g. p-polarized light) and absorption of at least 90% of an opposite polarization (e.g. s-polarized light) at a single wavelength of light; or
2. transmission of at least 90% of one polarization (e.g. p-polarized light) and absorption of at least 60% of an opposite polarization (e.g. s-polarized light) at all wavelengths from 400 nm through 700 nm.

What is claimed is:

1. A wire grid polarizer comprising:
   a. a transmissive substrate;
   b. an array of parallel, elongated first rib groups disposed over the substrate, each first rib group comprising:
      i. a central first transmissive rib; and
      ii. a pair of first wires including a first wire disposed along each side of the first transmissive rib;
   c. a first dielectric material substantially filling first gaps between each rib group and an adjacent rib group;
   d. an array of parallel, elongated second wires disposed over the first rib groups and the first dielectric material, on a same side of the substrate as the first rib groups, and farther from the substrate than the first rib groups;
   e. the first wires are absorptive and the second wires are reflective; and
   f. a pitch of the first wires is less than a pitch of the second wires.

2. The polarizer of claim 1, wherein:
   a. the first dielectric material extends from the gaps above and over tops of the rib groups and has a substantially flat, planar top-surface;
   b. the first dielectric material is substantially transmissive to the incident light; and
   c. the second wires are disposed on the top-surface of the first dielectric material.

3. The polarizer of claim 1, wherein the first dielectric material forms separate first dielectric ribs, with a first dielectric rib in one first gap separate from a first dielectric rib in an adjacent first gap.

4. The polarizer of claim 1, wherein a pitch of the first transmissive ribs is less than 150 nanometers.

5. The polarizer of claim 1, wherein the polarizer transmits at least 90% of one polarization and absorbs at least 90% of an opposite polarization at a single wavelength of light.

6. The polarizer of claim 1, wherein the polarizer transmits at least 90% of one polarization and absorbs at least 80% of an opposite polarization at all light wavelengths from 400 nm through 700 nm.

7. The polarizer of claim 1, wherein the pitch of the first wires is less than 75 nanometers and the pitch of the second wires is less than 200 nanometers.

8. The polarizer of claim 1, wherein the pitch of the second wires divided by the pitch of the first wires is at least 1.8.

9. The polarizer of claim 1, wherein the first wires extend along each side of the first transmissive rib from a bottom of the first transmissive rib to a top of the first transmissive rib.

10. The polarizer of claim 1, wherein a width of the first wires is between 5 nm and 20 nm and a thickness of the first wires is between 150 nm and 300 nm.

11. The polarizer of claim 1, wherein the first wires have an aspect ratio between 8 and 60, where the aspect ratio equals first wire thickness divided by first wire width.

12. A wire grid polarizer comprising:
   a. a transmissive substrate;
   b. an array of parallel, elongated first rib groups disposed over the substrate, each first rib group comprising:
      i. a central first transmissive rib, the first transmissive rib being integral with, and formed of the same material as, the transmissive substrate; and
      ii. a pair of first wires including a first wire disposed along each side of the first transmissive rib, the first wires extending along each side of the first transmissive rib from a bottom of the first transmissive rib to a top of the first transmissive rib, the first wires having an aspect ratio between 8 and 60, where the aspect ratio equals first wire thickness divided by first wire width;
   c. a first dielectric material substantially filling first gaps between each rib group and an adjacent rib group, the first dielectric material being transmissive;
   d. an array of parallel, elongated second wires disposed over the rib groups and the first dielectric material, on a same side of the substrate as the first rib groups, and farther from the substrate than the first rib groups;
   e. the first wires are absorptive and the second wires are reflective; and f. a pitch of the first wires is less than a pitch of the second wires.

13. The polarizer of claim 12, wherein the pitch of the second wires divided by the pitch of the first wires is at least 1.8.

14. The polarizer of claim 12, wherein:
   a. the first dielectric material extends from the gaps above and over tops of the rib groups and has a substantially flat, planar top-surface;
   b. the first dielectric material is substantially transmissive to the incident light; and
   c. the second wires are disposed on the top-surface of the first dielectric material.

15. The polarizer of claim 12, wherein the first dielectric material forms separate first dielectric ribs, with a first dielectric rib in one first gap separate from a first dielectric rib in an adjacent first gap.

16. The polarizer of claim 12, wherein a pitch of the first transmissive ribs is less than 150 nanometers.

17. The polarizer of claim 12, wherein the polarizer transmits at least 90% of one polarization and absorbs at least 90% of an opposite polarization at a single wavelength of light.

18. The polarizer of claim 12, wherein the polarizer transmits at least 90% of one polarization and absorbs at least 80% of an opposite polarization at all light wavelengths from 400 nm through 700 nm.

19. The polarizer of claim 12, wherein the pitch of the first wires is less than 75 nanometers and the pitch of the second wires is less than 200 nanometers.

20. The polarizer of claim 12, wherein a width of the first wires is between 5 nm and 20 nm and a thickness of the first wires is between 150 nm and 300 nm.

* * * * *